March 17, 1959 W. W. WITTENBERGER 2,877,888
CONVEYOR BELT
Filed Jan. 3, 1956
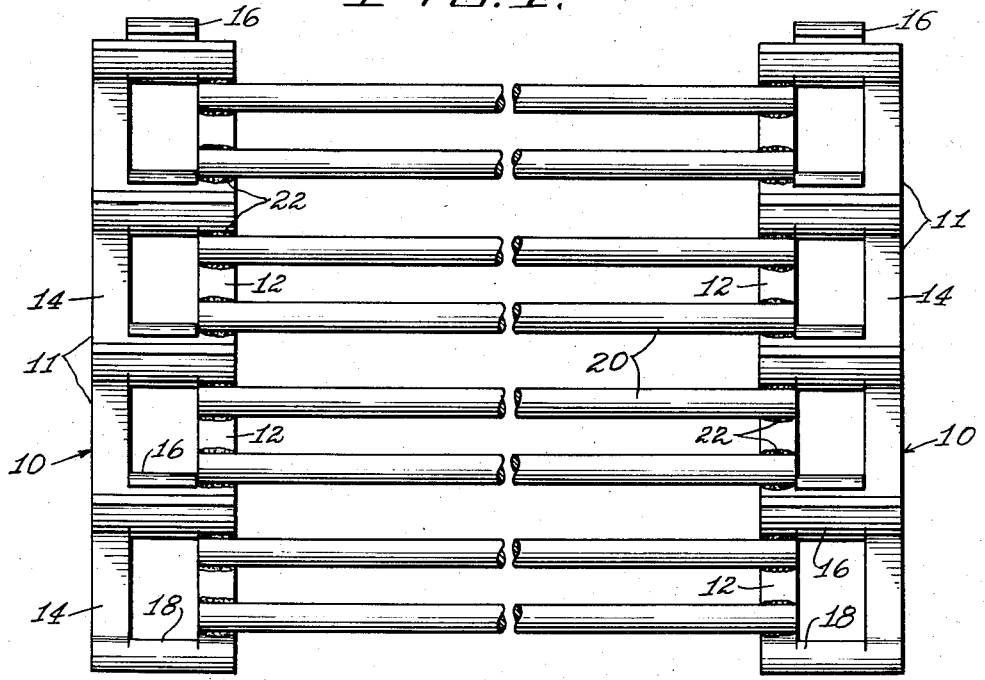
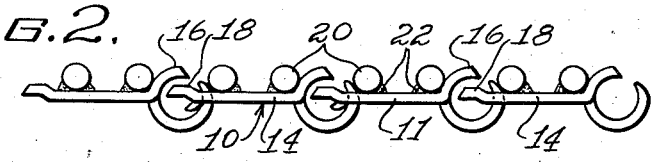
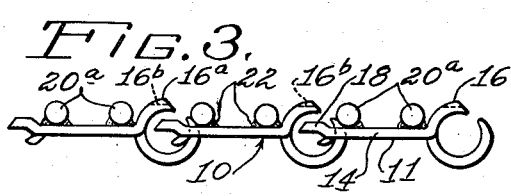
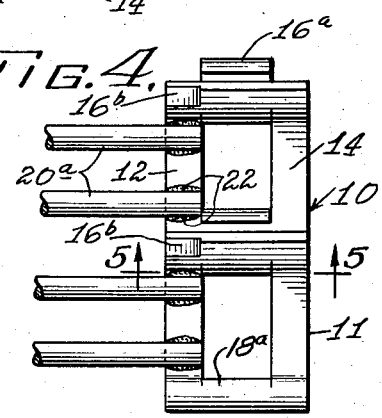
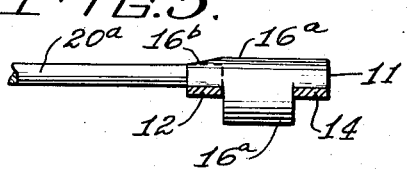
Inventor:
Wallace W. Wittenberger
By Bair Freeman & Molinare
Attys.

U nited States Patent Office
2,877,888
Patented Mar. 17, 1959

2,877,888

CONVEYOR BELT

Wallace W. Wittenberger, Elmhurst, Ill., assignor, by mesne assignments, to Baker Perkins, Inc., Saginaw, Mich., a corporation of New York Application January 3, 1956, Serial No. 557,000

3 Claims. (Cl. 198—195)

The present invention relates to conveyor belts for supporting articles thereon while being transported from one point to another, and more particularly to conveyor belts of the type having openings therein. Conveyor belts of this type are extensively used in handling of various articles, including food stuffs such as, for example, in the baking field for conveying bread and pan straps. In handling of freshly baked bread and hot pan straps it is preferred to use an open type of conveyor belt to assist in rapid dissipation of heat by subjecting the articles to air circulation while being conveyed.

Conveyor belts, as generally used in commercial bread baking plants, are made up of a plurality of interconnected wires, of modified U-shaped form, with the intermediate portion constituting the support, and with the side portions hooked around the outer ends of the intermediate portion of the next adjacent form, and the spacing of said intermediate portions serving to provide an open or mesh-like supporting surface. Conveyor belts of this type, while extensively used, present many problems and objectionable conditions. Because of the nature of the wire belt, it necessarily is driven by sprocket wheels having teeth adapted to mesh in the spaces between adjacent intermediate wire portions of the U-shaped forms. Belting formed entirely of wire sections possesses a relatively low tensile strength and readily stretches, causing distortion and jamming with the sprocket wheels, and frequently results in the belt being torn to pieces. Because of the excessive stretch inherent in such a belt, which causes great variation in the pitch, such belts do not lend themselves to practical use for conveyors of appreciable length, such as sixty or seventy feet or more. Furthermore, because such belts can only be practically made from wire of relatively small diameter, such belts can only be produced in rather limited or narrow widths. While such wire belts have been found highly unsatisfactory, industry has been compelled to use them in the absence of nothing better being available for the purpose.

It is one of the objects of this invention to provide an improved open type of conveyor belt which possesses great tensile strength and which substantially eliminates all possibility of damage caused by jamming on sprocket wheels used therewith.

Another object is to provide a novel conveyor belt of the character indicated which is rugged, durable and which reduces possible stretch to the same degree as conventional detachable link chain.

A further object is to provide a novel, open type, conveyor belt of the character indicated which is so constructed as to permit articles carried thereon to be discharged therefrom in a direction transversely of the direction of travel of the belt.

Still another object is to provide a novel conveyor belt of the character indicated, which permits quick and easy replacement of units or sections thereof, and which is capable of being economically manufactured.

Other objects and advantages of this invention will be apparent from the following description, taken in connection with the accompanying drawings in which:

Figure 1 is a plan view of a portion of the conveyor belt embodying the present invention.

Figure 2 is an edge of a portion of the conveyor belt, taken at the right hand side of Figure 1.

Figure 3 is a view similar to Figure 2, showing a modified form of conveyor belt.

Figure 4 is a plan view of a portion of the modified conveyor belt represented in Figure 3.

Figure 5 is an enlarged, fragmentary sectional view taken substantially as indicated at line 5—5 on Figure 4.

The present application is a continuation-in-part of my co-pending application, Serial Number 536,426, filed September 26, 1955, now abandoned.

As may be seen in Figures 1 and 2 of the drawings, the conveyor belt embodying the present invention includes two parallel strands of conventional, detachable link chain 10, disposed and spaced apart in parallel relation. Each strand of chain is made up of a multiplicity of conventional chain links 11, which are constructed and arranged so as to permit quick and easy connection and disconnection of one link with respect to another. The link chain utilized is a more or less standard article of manufacture and is produced either as steel stampings or as castings. The construction, as herein illustrated in the drawings, employs links in the form of stampings. Each of the links 11, comprise a pair of transversely spaced apart, longitudinally extending, relatively flat, side members 12 and 14, which are interconnected at one end by a bearing member 16, and at the other end by a pintle member 18. The bearing and pintle portions of the links are so designed as to permit quick and easy interlocking connection with other links to make up a strand of chain, as is well understood in the art.

The two strands of chain indicated at 10 are interconnected by a plurality of transversely extending, longitudinally spaced apart, metallic rods 20, with the end portions of each rod rigidly connected, as by welding, as indicated at 22, to the inner side members 12, of a pair of aligned links 11 of the respective strands of chain. As seen in Figures 1 and 2 of the drawings, two rods 20 are interconnected to each pair of aligned links 11. The spacing between adjacent rods preferably is greater than the thickness (in longitudinal direction of the conveyor belt), of each of the rods 20, to provide substantial open areas or spaces to insure adequate circulation of air into direct contact with all surfaces of the articles being conveyed thereon.

As may be seen in Figure 2 of the drawings, the rods 20 are of a size so that on the upper run of the conveyor belt the top surfaces of said rods 20, and the top surface of the bearing members 18 of the respective links, are substantially flush. If desired, however, the top surface of the rods 20 may be disposed in a plane above the top surface of the bearing members 16 of the links of chain. The relationship of the top surfaces of the rods and the top surfaces of the bearing members of the links is such as will permit articles being conveyed on the conveyor belt to be discharged off of the belt in a direction transversely to the direction of travel of the belt. This is an important feature of the present invention which lends the novel conveyor belt for use in installations of the type where it is desired to selectively discharge articles off of the conveyor belt at a plurality of points or stations. The rods, as herein disclosed, are substantially circular in cross-section and, hence, provide substantially line contact with the articles supported thereon. Thus, friction is reduced to a practical minimum when articles are moved transversely of the conveyor belt for discharge therefrom.

The modified construction disclosed in Figures 3 to 5 of the drawings is substantially identical with the construction disclosed in Figures 1 and 2, with the exception that the rods, indicated at 20a, are of smaller diameter, with their upper surfaces lying below the top surfaces of the bearing members 16a of the links 11, and with the inner end portions of the bearing members 16a, in registration with the inner side members 12 of the links, beveled or chamfered, as indicated at 16b, to provide an inclined plane, preferably intersecting the plane of the tops of the rods 20a. By virtue of this construction, employing rods of a small height, articles on a conveyor belt may be moved in a direction transversely of its direction of travel, sliding over the top surfaces of the rods, and camming up the beveled surfaces 16b of the chain links, onto the bearings 16a, for complete discharge off of the conveyor belt. The remaining elements and constructional features of the conveyor belt being identical to corresponding elements and features of the belt shown in Figures 1 and 2, corresponding reference characters for such elements are utilized to identify such elements and features in the construction disclosed in Figures 3 to 5 of the drawings.

By virtue of the construction of the conveyor belt constituting the present invention, the strands of chain 10 are adapted to cooperate with sprocket wheels, in a conventional manner, for driving the conveyor belt and, hence, possible stretch of the conveyor belt is exactly the same as the possible stretch inherent in the conventional detachable link chains employed. As is well known, the tensile strength of the conventional detachable link chain utilized is quite substantial and, hence, the tensile strength of the novel conveyor belt constituting the present invention is necessarily several times that of conventional wire belts now extensively used. Moreover, my novel conveyor belt, by reason of its construction, is capable of withstanding greater loads than wire belts, without distortion.

My novel conveyor belt can be produced in various widths; and, if relatively great widths are desired, chain of larger link size possessing greater tensile strength may be utilized, and the size of the rods may be increased so as to provide adequate support for the loads to be handled by the conveyor belt. While belts as heretofore employed are intended for use in handling relatively light loads and, due to the fact that such wire belts can only be practically made from relatively small size wire, the width of such belts is necessarily restricted to a relatively narrow range. Furthermore, by virtue of the present construction utilizing conventional detachable link chain, there is provided a substantial bearing face upon the sprocket wheels, resulting in greatly reduced wear as compared to the use of wire belts, thereby reducing maintenance costs. If a section of the novel conveyor belt becomes damaged, it can be quickly and easily replaced by merely separating links of chains in a conventional manner.

Although I have herein shown and described certain preferred embodiments of my invention, manifestly it is capable of modification and rearrangement without departing from the spirit and scope thereof. I do not, therefore, wish to be understood as limiting this invention to the precise embodiment herein disclosed, except as I may be so limited by the appended claims.

I claim:
1. A conveyor belt comprising two transversely spaced apart strands of detachable link chain, the links of said chains all being identical and of unitary construction and each comprising a pair of transversely spaced apart straight parallel side members, interconnected at one end by a bearing member and at the other end by a pintle member, said side members lying in a plane intermediate the thickness of the bearing members and a plurality of transversely extending, longitudinally spaced apart metal rods, rigidly and directly connected at opposite end portions to the upper surface of the inner side members of aligned sets of links of the respective strands, the end portions of said rods overlying said inner side members of the links, the top surfaces of said rods and the top surfaces of portions of the bearing members of said links being disposed in alignment to permit objects carried on the belt to be discharged off said belt in a transverse direction thereof.

2. A conveyor belt comprising two transversely spaced apart strands of detachable link chain, the links of said chains all being identical and of unitary construction and each comprising a pair of transversely spaced apart straight parallel side members, interconnected at one end by a bearing member and at the other end by a pintle member, said side members lying in a plane intermediate the thickness of the bearing members and a plurality of transversely extending, longitudinally spaced apart metal rods, rigidly and directly connected at opposite end portions to the inner side members of aligned sets of links of the respective strands, the end portions of said rods overlying said inner side members of the links, the top surfaces of said rods extending upwardly from said side members of the links, a distance at least as great as the distance the bearing members extend above the corresponding side of said side members of the links.

3. A conveyor belt comprising two transversely spaced apart strands of detachable link chain, the links of said chains each comprising a pair of transversely spaced apart side members, interconnected at one end by a bearing member and at the other end by a pintle member, and a plurality of transversely extending, longitudinally spaced apart rods, rigidly connected at opposite end portions to the upper surface of the inner side members of aligned sets of links of the respective strands, the top surfaces of said rods lying below the top surfaces of the bearing members of said links and the inner end portions of said bearing members being beveled, whereby to permit objects carried on the belt to be discharged off of the belt in a direction transversely to the direction of travel of the belt.

References Cited in the file of this patent
UNITED STATES PATENTS

| | | |
|---|---|---|
| 331,703 | Grater et al. | Dec. 1, 1885 |
| 401,285 | Loree | Apr. 9, 1889 |
| 796,947 | Thomas | Aug. 8, 1905 |
| 1,676,481 | Crummey et al. | July 10, 1928 |
| 1,936,764 | King | Nov. 28, 1933 |
| 2,387,918 | Lockwood | Oct. 30, 1945 |

FOREIGN PATENTS

| | | |
|---|---|---|
| 516,877 | Belgium | Jan. 31, 1953 |